United States Patent
Paxton et al.

(10) Patent No.: US 10,741,873 B2
(45) Date of Patent: Aug. 11, 2020

(54) COMPOSITION FOR SINTERED LITHIUM TITANATE-LITHIUM LANTHANUM TITANIUM OXIDE COMPOSITE

(71) Applicant: Ford Global Technologies, LLC, Dearborn, MI (US)

(72) Inventors: William Arthur Paxton, Dearborn, MI (US); Daniel Murray, Plymouth, MI (US); Venkataramani Anandan, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 57 days.

(21) Appl. No.: 16/036,686

(22) Filed: Jul. 16, 2018

(65) Prior Publication Data
US 2020/0020970 A1    Jan. 16, 2020

(51) Int. Cl.
| | |
|---|---|
| *H01M 10/052* | (2010.01) |
| *H01M 4/131* | (2010.01) |
| *H01M 4/04* | (2006.01) |
| *H01M 4/02* | (2006.01) |

(52) U.S. Cl.
CPC ....... *H01M 10/052* (2013.01); *H01M 4/0404* (2013.01); *H01M 4/0421* (2013.01); *H01M 4/131* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 8,808,407 | B2 * | 8/2014 | Inda | H01M 4/13 29/623.5 |
| 9,266,780 | B2 * | 2/2016 | Ogasa | B32B 18/00 |
| 2009/0136415 | A1 * | 5/2009 | Gorshkov | C01G 23/005 423/598 |
| 2009/0193648 | A1 * | 8/2009 | Inda | H01M 4/13 29/623.3 |
| 2017/0179472 | A1 * | 6/2017 | Allie | H01M 6/185 |
| 2018/0219224 | A1 * | 8/2018 | Esaki | H01M 4/131 |
| 2019/0157724 | A1 * | 5/2019 | Wolter | H01M 2/1646 |

OTHER PUBLICATIONS

High-strength all-solid lithium ion electrodes based on Li4Ti5O12, Journal of Power Sources, vol. 196 iss. 15, Aug. 1, 2011, pp. 6507-6511 (Year: 2011).*

* cited by examiner

*Primary Examiner* — Scott J. Chmielecki
(74) *Attorney, Agent, or Firm* — David Kelley; Brooks Kushman P.C.

(57) ABSTRACT

A pre-sintered all-solid-state battery comprises a powdered lithium titanate (LTO), a powdered lithium lanthanum titanium oxide (LLTO), and a solid lithium compound configured to suppress formation of inactive phases during sintering. The solid lithium compound is about 0.5% to 10% by weight of the pre-sintered all-solid-state battery.

17 Claims, 3 Drawing Sheets

COMPOSITION FOR SINTERED LITHIUM TITANATE-LITHIUM LANTHANUM TITANIUM OXIDE COMPOSITE

TECHNICAL FIELD

The present disclosure relates to an all-solid-state battery, and more particularly, a composition for a sintered composite for an all-solid-state battery.

BACKGROUND

An all-solid-state battery (ASSB) can provide the energy density and safety requirements for electric vehicles in the future. For an ASSB to be functional, there must be sufficient contact formed between the solid electrolyte and the solid electrode materials. This is typically achieved by sintering, a process which involves heating a compacted monolithic body of powder for a period of time during which the body densities and the internal pores are greatly reduced or eliminated. Many solid electrolyte and solid electrode materials react under normal sintering conditions, yielding a different chemical composition than was initially chosen based on capacity and efficiency considerations. The reacted phases formed after sintering result in a densified body, but a non-functional ASSB.

A lithium titanate ($Li_4Ti_5O_{12}$) (LTO) based all-solid-state battery offers significant improvements in safety, energy density, and thermal stability over conventional LTO-based Li-ion batteries. During sintering, LTO reacts with the solid electrolyte and forms inactive phases of lithium, titanium, and oxygen. LTO is more stable during sintering with lithium lanthanum titanium oxide (LLTO) ($Li_{3x}La_{2/3-x}TiO_3$) as the solid electrolyte, however, LTO and LLTO still react at the elevated temperatures required for sintering. For example, sintering of 50:50 by weight mixture of LTO and LLTO at 1000° C. for 10 hours will result in the formation of new phases of lithium, titanium, and oxygen, comprising 58% by weight of the composite, and a reduction in the amount of original active LTO and LLTO phases to just 3% and 38% by weight, respectively.

SUMMARY

According to an embodiment, a pre-sintered all-solid-state battery includes a powdered lithium titanate (LTO), a powdered lithium lanthanum titanium oxide (LLTO), and a solid lithium compound configured to suppress formation of inactive phases during sintering. The solid lithium compound is about 0.5% to 10% by weight of the pre-sintered all-solid-state battery.

According to one or more embodiments, the solid lithium compound may be $Li_2O$. In one or more embodiments, the solid lithium compound may be about 1% to 8% by weight of the pre-sintered all-solid-state battery. In an embodiment, the solid lithium compound may be about 2.5% by weight of the pre-sintered all-solid-state battery. According to some embodiments, the inactive phases may include $Li_2La_2Ti_3O_{10}$, $Li_2TiO_3$, $Li_2Ti_3O_7$, or a combination thereof. In one or more embodiments, the solid lithium compound may be a coating on the LTO, the LLTO, or both.

According to an embodiment, a method includes mixing powdered lithium titanate (LTO), powdered lithium lanthanum titanium oxide (LLTO), and a lithium compound to form a starting material having about 0.5% to 10% lithium compound by weight. The method further includes sintering the starting material to form a composite having decreased inactive phases relative to a composite formed from lithium compound-lacking starting materials having a same weight ratio of LTO to LLTO as the starting material.

According to one or more embodiments, the lithium compound may be $Li_2O$. In one or more embodiments, the lithium compound may be about 1% to 8% by weight of the starting material. In an embodiment, the lithium compound may be about 2.5% by weight of the starting material. According to one or more embodiments, the inactive phases may include $Li_2La_2Ti_3O_{10}$, $Li_2TiO_3$, $Li_2Ti_3O_7$, or a combination thereof.

According to an embodiment, a method includes coating a lithium compound on powdered lithium titanate (LTO), powdered lithium lanthanum titanium oxide (LLTO), or both, mixing LTO and LLTO to form a starting material having about 0.5% to 10% lithium compound by weight, and sintering the starting material to form a composite having decreased inactive phases relative to a composite formed from lithium compound-lacking starting materials having a same weight ratio of LTO to LLTO as the starting material.

According to one or more embodiments, the lithium compound may be $Li_2O$. In one or more embodiments, the lithium compound may be about 1% to 8% by weight of the starting material. In an embodiment, the lithium compound may be about 2.5% by weight of the starting material. According to one or more embodiments, the inactive phases may include $Li_2La_2Ti_3O_{10}$, $Li_2TiO_3$, $Li_2Ti_3O_7$, or a combination thereof. In one or more embodiments, coating the lithium compound may include coating via sol-gel or vapor deposition. In some embodiments, the lithium compound may be coated on the LTO. In certain embodiments, the lithium compound may be coated on the LLTO. In other embodiments, the lithium compound may be coated on both the LTO and LLTO.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A lithium titanate (LTO) ($Li_4Ti_5O_{12}$)lithium lanthanum titanium oxide (LLTO) ($Li_{3x}La_{2/3-x}TiO_3$) based all-solid-state battery (ASSB) may provide improved capacity and efficiency when compared with conventional LTO solid state batteries. However, the LTO and LLTO solid electrolyte react during sintering to form inactive phases of lithium, titanium, and oxygen, such as $Li_2Ti_3O_7$ and $Li_2Ti_1O_3$. The resulting composition after sintering yields non-functional electrodes.

According to embodiments, an LTO/LLTO ASSB is disclosed. The LTO/LLTO composite includes an additive such that, during sintering, formation of inactive phases of LTO is suppressed. Thus, the original active phases of LTO ($Li_4Ti_5O_{12}$) are maintained post-sintering to provide an efficient and high capacity densified monolithic compact. The additive is included in an amount capable of maximizing retention of original active phases required for electrochemical operation. An elevated amount of additive may result in other unwanted phases such as $Li_2La_2Ti_3O_{10}$ and additional $Li_2TiO_3$.

Figure 1:
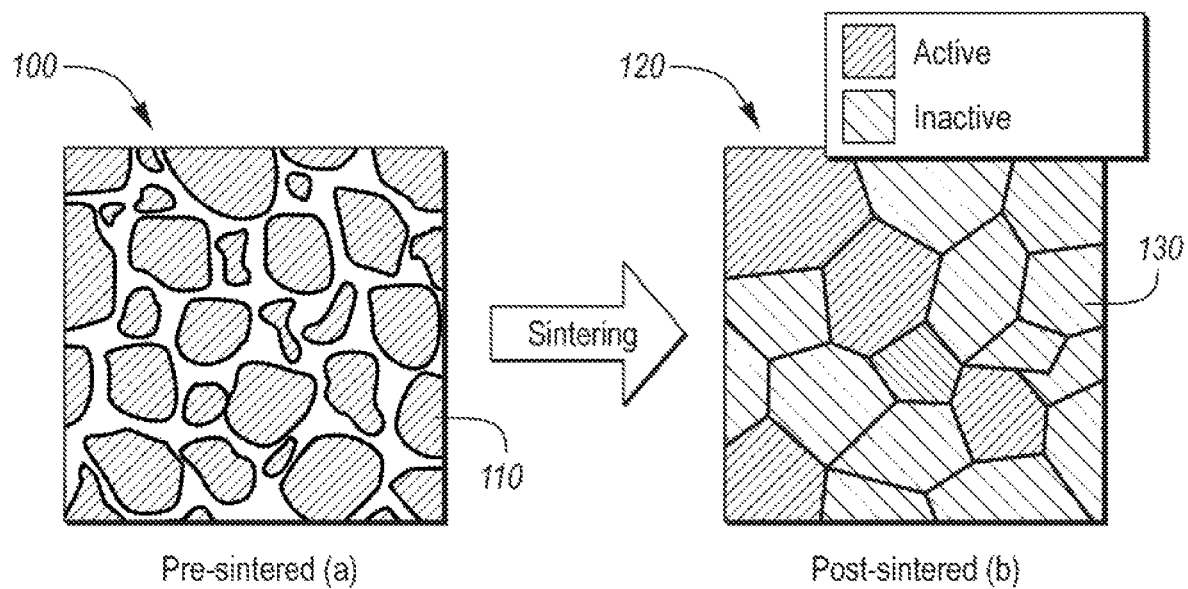
FIG. 1 shows a conventional lithium titanate (LTO)-lithium lanthanum titanium oxide (LLTO) composite before and after sintering.

Referring to FIG. 1, schematic diagrams of a conventional LTO/LLTO solid electrode composite before (a) and after (b) sintering are shown. Pre-sintered conventional starting materials 100 include active phases 110 of LTO and LLTO. Active phases 110 are shown collectively for LTO and LLTO for simplicity, and it should be understood that the LTO and LLTO particles are separate, each of the LTO and LLTO having active phases present. The active phases 110 of LTO serve as a lithium storage host, and the active phases 110 of LLTO provide conductivity of lithium ions. The conventional starting materials 100 are sintered to form a post-sintered compact (or composite) 120 in FIG. 1 (b). Post-sintered compact 120 includes active phases 110 of LTO and LLTO, but many of the active phases 110 have reacted to form inactive phases 130. Inactive phases include lithium-poor phases, such as, but not limited to, $Li_2Ti_3O_7$. Thus, the resulting compact 120 with inactive phases 130 yields a non-functional electrode due to the reduction in active phases 110.

Figure 2:
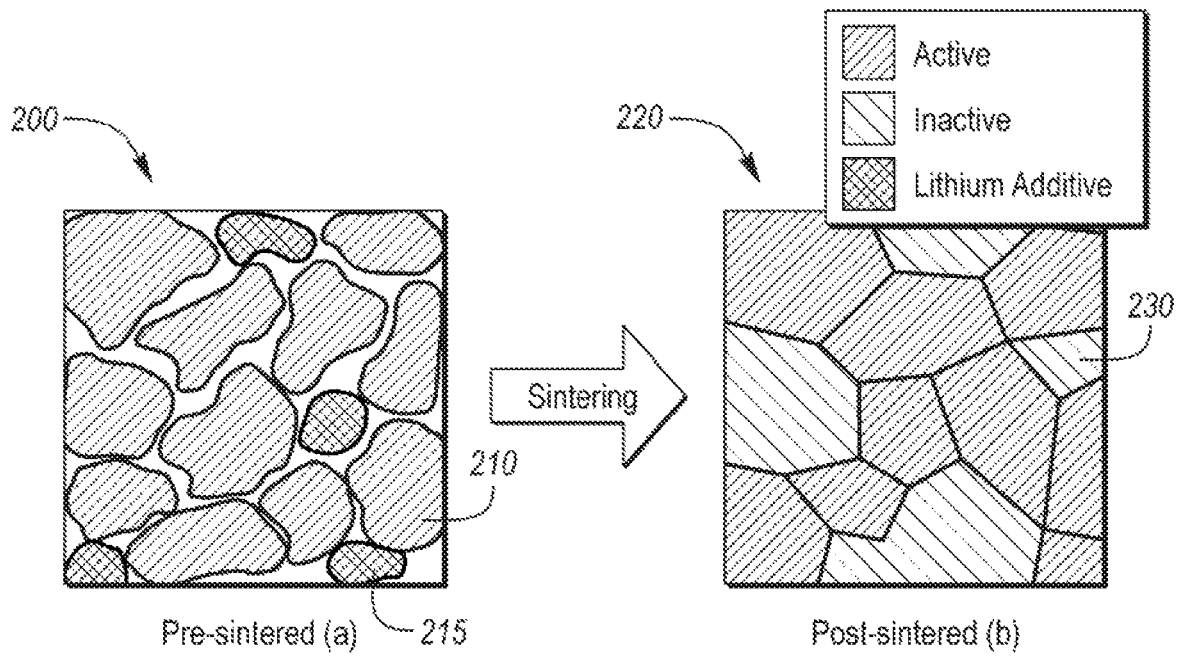
FIG. 2 shows an LTO-LLTO composite before and after sintering, according to an embodiment.

Referring to FIG. 2, schematic diagrams of an LTO/LLTO solid electrode composite before (a) and after (b) sintering are shown, according to an embodiment. The pre-sintered composite (or starting materials) 200 includes active phases 210 of LTO and LLTO. As noted for FIG. 1, although active phases 210 are shown collectively as LTO and LLTO for simplicity purposes, the LTO and LLTO particles are separate, and each of the LTO and LLTO have active phases present. The active phases 210 of the solid electrode are provided by solid materials, such as powdered LTO and LLTO starting materials. The starting materials of the pre-sintered composite 200 further include an additive 215, such as, but not limited to, a lithium compound or lithium additive. Non-limiting examples of additive 215 include Li, $Li_2O$, $Li_2CO_3$, $Li_2C_2$, $LiNO_3$, $LiN_3$, LiF, and LiCl. In an embodiment, the additive 215 may be a solid material, such as a powdered material, mixed with the powdered active material (LTO/LLTO) particles. In another embodiment, the additive 215 may be coated on the solid LTO and/or LLTO particles as a thin coat. After sintering, a post-sintered compact (or composite) 220 includes fewer inactive phases 230 when compared to a compact sintered without the additive 215. As such, the post-sintered compact 220 retains the original active phases 210 during sintering.

By adding the additive 215 (hereinafter, referred to interchangeably as $Li_2O$), the formation of the inactive phases 230 is suppressed because the additional components (additive 215) can react during sintering with the starting materials to maintain the original phases. In one or more embodiments, the additive 215 is $Li_2O$. The $Li_2O$ comprises about 0.5% to about 10% by weight of the composite. In some embodiments, the $Li_2O$ is about 0.5% to 5% by weight of the composite. In certain embodiments, the $Li_2O$ may be about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%. In an embodiment, the $Li_2O$ is about 2.5% by weight of the pre-sintered composite.

Figure 3:
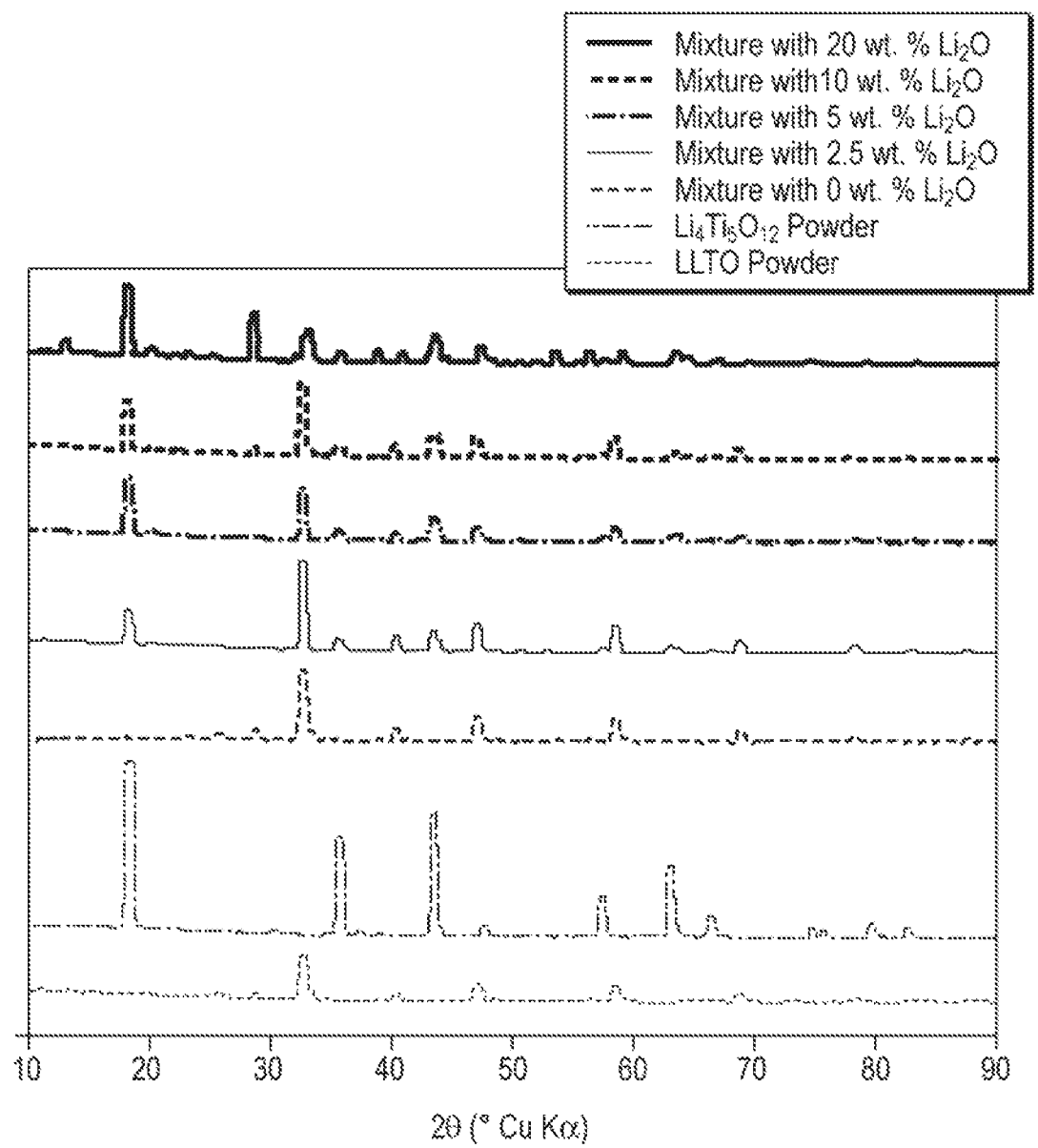
FIG. 3 is a graph showing the diffraction of pristine powders and sintered mixtures of LTO and LLTO, according to embodiments.
Figure 4:
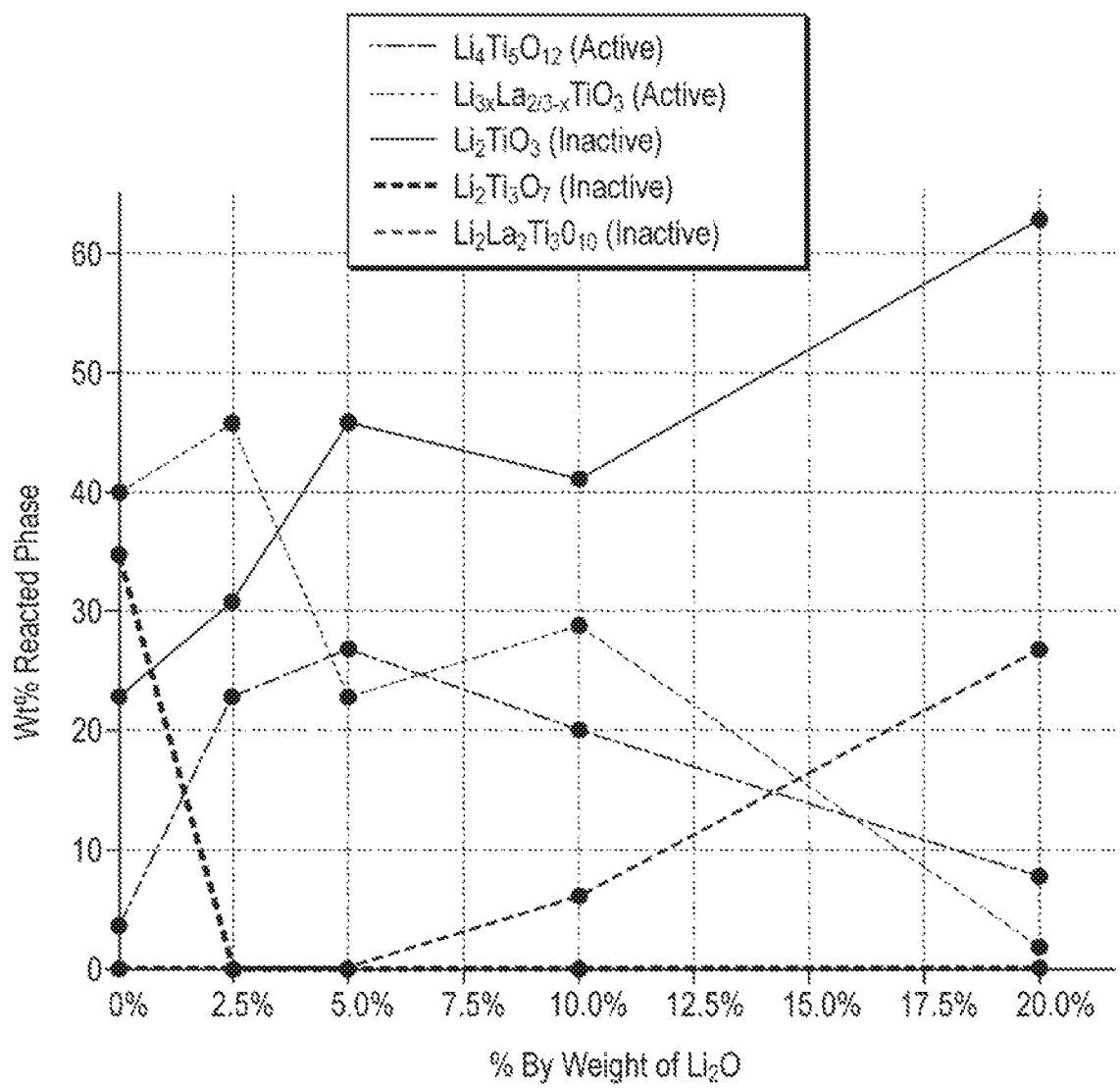
FIG. 4 is a graph showing the reacted phases present in sintered sample composites, according to embodiments.

Referring to FIG. 3, diffractograms of pristine LTO and LLTO powders are shown. Additionally, patterns for sintered 50/50 LTO:LLTO mixtures are shown, with about 0%, 2.5%, 5%, 10%, and 20% by weight excess $Li_2O$. As shown in FIG. 3, by including about 1% to about 5% by weight of the $Li_2O$, the active phases of LTO and LTO are maintained. $Li_2O$ in excess of about 10% may lead to unwanted phases, such as lithium-poor phases. Referring to FIG. 4, the quantity of the reacted phases present in the various compositions of sintered samples is shown. As shown in FIG. 4, the addition of about 2.5% by weight of $Li_2O$ has aided in maintaining the original phases required for electrochemical operation and suppressing the unwanted lithium-poor phases.

According to embodiments of the present disclosure, a method of forming a LTO/LLTO ASSB is disclosed. The ASSB includes a solid electrode made of solid starting materials, such as powdered LTO and powdered LLTO. The LTO-based solid electrodes further include an additive, such as a lithium compound or lithium additive. Non-limiting examples of an additive for the LTO-based solid electrode include Li, $Li_2O$, $Li_2CO_3$, $Li_2C_2$, $LiNO_3$, $LiN_3$, LiF, and LiCl. In an embodiment, $Li_2O$ is the additive. The presence of the additive suppresses formation of inactive phases in the solid electrode. In an embodiment, the method includes mixing powdered lithium titanate (LTO), powdered lithium lanthanum titanium oxide (LLTO), and a lithium compound to form a starting material having about 0.5% to 10% lithium compound by weight. The method further includes sintering the starting material to form a composite having decreased inactive phases relative to a composite formed from lithium compound-lacking starting materials having a same weight ratio of LTO to LLTO as the starting material.

In another embodiment, the method includes coating a lithium compound on to LTO, LLTO, or both. Then, the powders are mixed, to form a starting material having about 0.5% to 10% lithium compound by weight. The starting material is then sintered to form a composite having decreased inactive phases relative to a composite formed from lithium compound-lacking starting materials having a same weight ratio of LTO to LLTO as the starting material. The lithium compound or additive may be coated onto the particles by any suitable method, such as, but not limited to, sol-gel or vapor deposition. The thickness of the coating on the particles, or the content of powdered $Li_2O$ included may depend on the amount of active phases provided in the LTO and LLTO powders.

According to the present disclosure, an all-solid-state battery (ASSB) is provided. The ASSB includes an LTO/LLTO solid electrode. The LTO/LLTO solid electrode further includes an additive, such as a lithium compound or lithium additive, configured to suppress formation of unwanted phases of LTO and/or LLTO during sintering. As such, the lithium compound or lithium additive maintains the original active phases in the solid electrode, thus forming a functional ASSB. In some embodiments, the lithium additive may be about 0.5% to 10% by weight of the solid electrode. In an embodiment, the lithium additive may be $Li_2O$.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pre-sintered all-solid-state battery comprising:
a powdered lithium titanate (LTO);
a powdered lithium lanthanum titanium oxide (LLTO); and
a solid lithium compound configured to suppress formation of inactive phases during sintering,
wherein the solid lithium compound is Li, $Li_2O$, $Li_2CO_3$, $Li_2C_2$, $LiNO_3$, $LiN_3$, LiF, or LiCl and is about 0.5% to 10% by weight of the pre-sintered all-solid-state battery, and wherein upon sintering, the inactive phases comprise at most about 45% by weight of a reacted phase all-solid-state battery.

2. The pre-sintered all-solid-state battery of claim 1, wherein the solid lithium compound is about 1% to 8% by weight of the pre-sintered all-solid-state battery.

3. The pre-sintered all-solid-state battery of claim 1, wherein the solid lithium compound is about 2.5% by weight of the pre-sintered all-solid-state battery.

4. The pre-sintered all-solid state battery of claim 1, wherein the inactive phases include tetragonal LLTO, $Li_2TiO_3$, $Li_2Ti_3O_7$, or a combination thereof.

5. The pre-sintered all-solid-state battery of claim 1, wherein the solid lithium compound is a coating on the LTO, the LLTO, or both.

6. A method comprising:
mixing powdered lithium titanate (LTO), powdered lithium lanthanum titanium oxide (LLTO), and a lithium compound to form a starting material having about 0.5% to 10% lithium compound by weight; and
sintering the starting material to form a composite having decreased inactive phases relative to a composite formed from lithium compound-lacking starting materials having a same weight ratio of LTO to LLTO as the starting material,
wherein the lithium compound is Li, $Li_2O$, $Li_2CO_3$, $Li_2C_2$, $LiNO_3$, $LiN_3$, LiF, or LiCl, and each of the inactive phases is at most about 45% by weight of the composite.

7. The method of claim 6, wherein the lithium compound is about 1% to 8% by weight of the starting material.

8. The method of claim 6, wherein the lithium compound is about 2.5% by weight of the starting material.

9. The method of claim 6, wherein the inactive phases include tetragonal LLTO, $Li_2TiO_3$, $Li_2Ti_3O_7$, or a combination thereof.

10. A method comprising:
coating a lithium compound on powdered lithium titanate (LTO), powdered lithium lanthanum titanium oxide (LLTO), or both;
mixing LTO and LLTO to form a starting material having about 0.5% to 10% lithium compound by weight; and
sintering the starting material to form a composite having decreased inactive phases relative to a composite formed from lithium compound-lacking starting materials having a same weight ratio of LTO to LLTO as the starting material,
wherein the lithium compound is Li, $Li_2O$, $Li_2CO_3$, $Li_2C_2$, $LiNO_3$, $LiN_3$, LiF, or LiCl, and each of the inactive phases is at most about 45% by weight of the composite.

11. The method of claim 10, wherein the lithium compound is about 1% to 8% by weight of the starting material.

12. The method of claim 10, wherein the lithium compound is about 2.5% by weight of the starting material.

13. The method of claim 10, wherein the inactive phases include tetragonal LLTO, $Li_2TiO_3$, $Li_2Ti_3O_7$, or a combination thereof.

14. The method of claim 10, wherein coating the lithium compound includes coating via sol-gel or vapor deposition.

15. The method of claim 10, wherein the lithium compound is coated on the LTO.

16. The method of claim 10, wherein the lithium compound is coated on the LLTO.

17. The method of claim 10, wherein the lithium compound is coated on both the LTO and LLTO.

* * * * *